Aug. 30, 1932.   A. W. CONLEY   1,874,455
OZONIZER
Filed Dec. 10, 1928    2 Sheets-Sheet 1
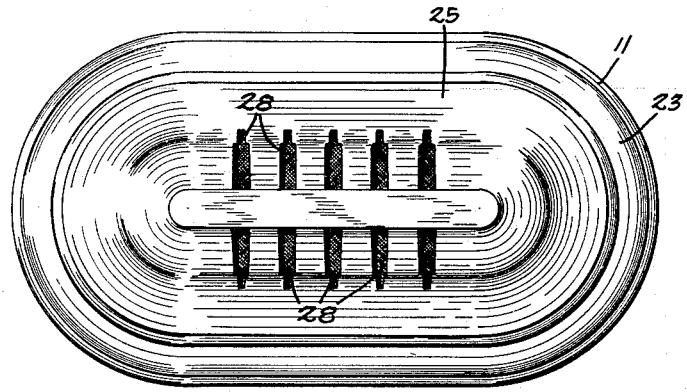
Fig. 1
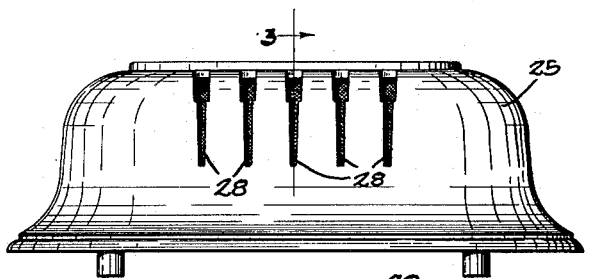
Fig. 2
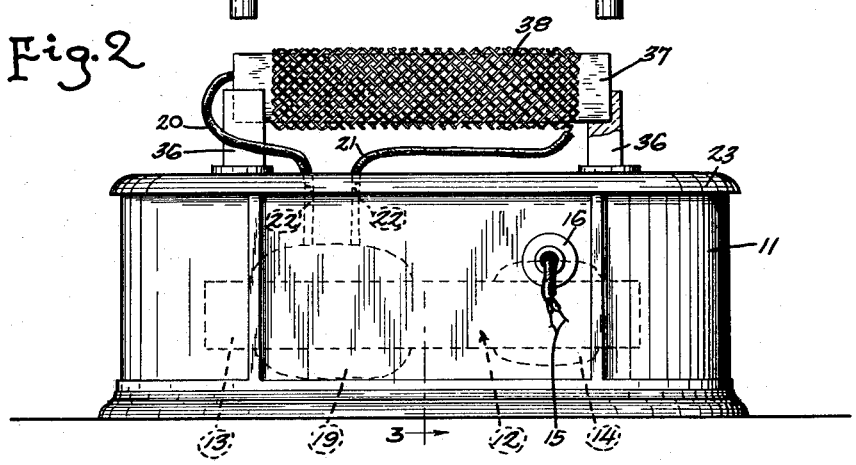
Arthur W. Conley
Inventor
by Smith and Freeman
Attorneys

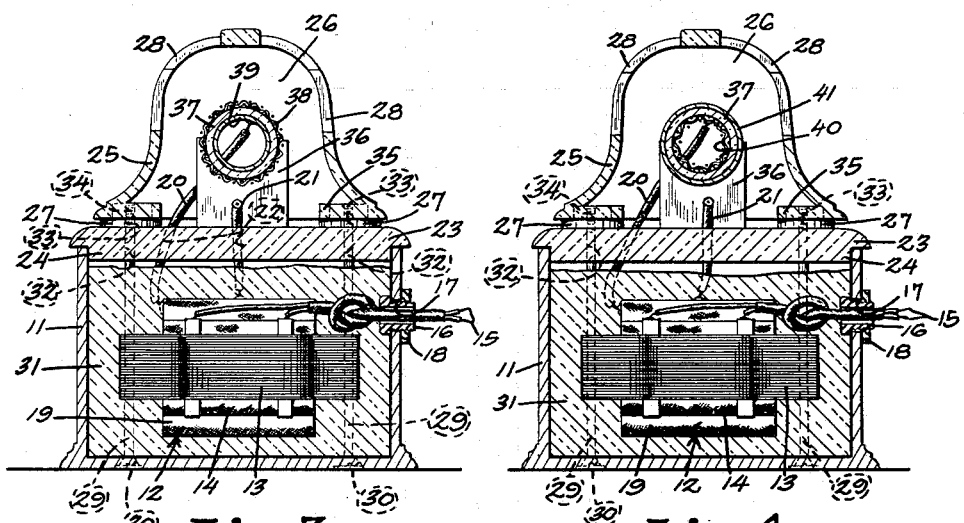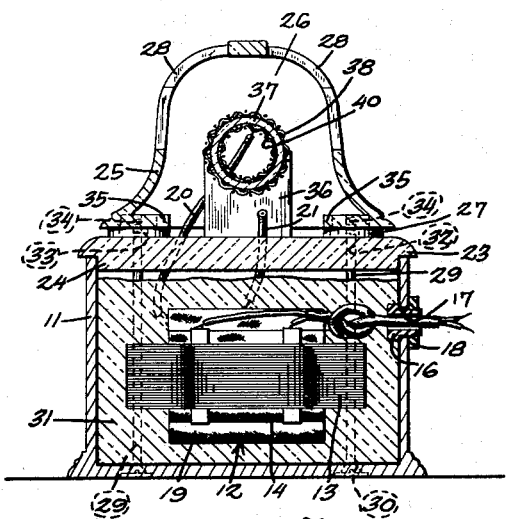

Patented Aug. 30, 1932						1,874,455

UNITED STATES PATENT OFFICE

ARTHUR W. CONLEY, OF CLEVELAND HEIGHTS, OHIO, ASSIGNOR, BY MESNE ASSIGNMENTS, TO THE COROZONE COMPANY, OF WILMINGTON, DELAWARE, A CORPORATION OF DELAWARE

OZONIZER

Application filed December 10, 1928. Serial No. 324,869.

My invention relates to ozonizers, and particularly to ozonizers for use as air deodorizers and purifiers, as in offices, hotels, homes, railroad cars, and the like, and the principal object of my invention is to provide a new and improved ozonizer particularly suited for these purposes. In the drawings accompanying this specification and forming a part of this application I have shown, for purposes of illustration, certain forms which my invention may assume, and in these drawings:

Figure 1 is a top plan view of one embodiment of my invention herein shown,

Figure 2 is a side elevation of the device shown in Figure 1 with the cover raised, Figure 3 is a section on the line 3—3 of the Figure 2, Figure 4 is a section similar to Figure 3, but showing a second embodiment, while Figure 5 is a section similar to Figures 3 and 4 but showing a third embodiment.

The embodiment of my invention disclosed in Figures 1 through 3 comprises a casing 11 preferably formed as an aluminum die casting, and open at the top, and within this casing is positioned a transformer 12 comprising a core 13, a primary coil 14 having its ends connected to conductors 15 emerging from the casing 11 through a bushing 16 passing through an aperture 17 in the side wall of the casing 11 and held in position by means of a nut 18, and a secondary coil 19 having its ends connected to two conductors 20 and 21 which emerge from the casing 11 through apertures 22 in a casing top 23 which closes the open top of the casing 11.

After the transformer 12 has been so positioned and arranged I prefer to embed the transformer 12 in material 31 such as pitch poured about the transformer 12 to substantially fill the casing 11.

The top 23 I prefer to form of bakelite, and with a shoulder 24 by which it is held against lateral movement relative to the casing 11; on this top 23 I mount a cover 25 also preferably formed of bakelite, defining with the top 23 a chamber 26, spaced from the top 23 by four feet 27 to provide a communication space between the upper surface of the top 24 and the lower rim of the cover 25, provided also with louvres 28 to provide for additional communication between the chamber 26 and the exterior, and held in position by four machine screws 29 passing upwardly through apertures 30 in the base of the casing 11, through the material 31 within the casing 11, through apertures 32 in the top 23, through apertures 33 in the feet 27, and finally coacting with screw apertures 34 formed in a flange 35 forming the lower rim of the cover 25, the machine screws 39 serving thus to hold in position both the cover 25 and the top 23.

Rising from the upper surface of the top 23 are a pair of cradles 36 in which rests a glass tube 37, about the outer face of the tube 37 is an outer tubular electrode 38 connected to the secondary conductor 21, and on the inner face of the tube 37 is an inner tubular electrode 39 connected to the secondary conductor 20. In the embodiment of my invention shown in Figures 1 through 3 the inner electrode 39 may be merely a metal lining cemented to the inner surface of the glass tube 37, and the outer tubular electrode 38 is a tube of wire mesh of appropriate size formed from oxidation resisting metal such as aluminum.

In operation the primary conductors 15 are connected to a suitable source of alternating current, for example the usual 110 volt supply line, whereupon there is induced in the secondary coil 19 an alternating tension of high magnitude, say of the order of 10,000 volts, and this is impressed upon the electrodes 38 and 39 and, being insufficient to either puncture the glass tube 37 or to arc across, it causes a substantially silent discharge which occurs particularly on the rough-surfaced electrode 38 and in the usual manner produces ozone from and in the air passing through the chamber 26 so that the air emerging from the chamber 26 is relatively heavily ladened with ozone effective to deodorize and disinfect.

In the embodiment of my invention disclosed in Figure 4 I interchange the electrodes, utilizing an internal electrode 40 of the construction of the external electrode 38 of Figures 1 through 3 and an external electrode 41 of the construction of the internal electrode 39 of the device of Figures 1 through 3, while in Figure 5 I form both electrodes of the aluminum wire mesh utilizing in effect for the internal electrode the internal electrode 40 of the device of Figure 4 and for the external electrode the external electrode 38 of the device of Figures 1 through 3, accomplishing by this change a simplification of construction and in addition probably an increase in the amount of oxygen produced.

From the foregoing it will be obvious to those skilled in the art that I have provided new and improved ozonizers particularly adapted for disinfecting and deodorizing in such places as offices, hotels, homes, railroad cars, and the like, and accordingly that I have accomplished at least the principal object of my invention. At the same time those skilled in the art will realize that the embodiments of my invention herein shown and described embody advantages other than those specifically pointed out or suggested herein, also that these particular embodiments may be variously changed and modified without departing from the spirit of my invention or sacrificing the advantages thereof, accordingly it will be understood that the disclosure is illustrative only, and that my invention is not limited thereto.

I claim:

1. An ozonizer, comprising: a closing casing and a transformer entirely enclosed therewithin; electrode means connected to the secondary terminals of said transformer and supported on top of said casing; and a cover supported by said top and enclosing said electrode means, said cover having its edges adjacent said top spaced from said top and providing communication between the exterior and interior of said cover.

2. An ozonizer, comprising: a casing having a transformer disposed therewithin and a top wall closing said casing; electrode means connected to the secondary terminals of said transformer and supported on the top wall of said casing; a cover supported by said top wall co-acting with said top wall to enclose said electrode means, said cover having its edges adjacent said top spaced from said top and providing communication between the exterior and interior of said cover; and fastening elements extending entirely through said casing, through said top wall, and secured to said cover, thereby securing said casing, top wall, and cover together.

3. An ozonizer, comprising: a closed casing having a transformer entirely enclosed therewithin; horizontally spaced cradles supported by the top wall of said casing, each having a seat; elongated electrode means connected to the secondary terminals of said transformer and having its end portions supported in the seats of said cradles; and a cover supported by said top and enclosing said electrode means and said cradles; said cover having its edges adjacent said top spaced from said top and providing communication between the exterior and interior of said cover.

4. An ozonizer, comprising: a closed casing having a transformer disposed therewithin and filled with hard insulating material disposed about and supporting said transformer in position in said casing; horizontally spaced cradles supported by the top wall of said casing, each having a seat; elongated electrode means connected to the secondary terminals of said transformer and having its end portions supported in the seats of said cradles; and a cover supported by said top and enclosing said electrode means and said cradles, said cover having its edges adjacent said top spaced from said top and providing communication between the exterior and interior of said cover.

5. An ozonizer, comprising: a casing having a top wall closure, a transformer disposed within said casing, said casing being filled with hard insulating material disposed about and supporting said transformer in position in said casing; horizontally spaced cradles supported by the top wall of said casing, each having a seat; elongated electrode means connected to the secondary terminals of said transformer and having its end portions supported in the seats of said cradles; a cover supported by said top and enclosing said electrode means and said cradles, said cover having its edges adjacent said top spaced from said top and providing communication between the exterior and interior of said cover; and fastening elements extending entirely through said casing, through said top wall closure, and secured to said cover, thereby securing said casing, top wall closure and cover together.

In testimony whereof I hereunto affix my signature.

ARTHUR W. CONLEY.